United States Patent [19]

Davis

[11] Patent Number: 5,037,906

[45] Date of Patent: Aug. 6, 1991

[54] HIGH SOLIDS PROCESS FOR THE PRODUCTION OF WATER SOLUBLE POLYMERS BY EXOTHERMIC POLYMERIZATION

[75] Inventor: William B. Davis, Darien, Conn.

[73] Assignee: American Cyanamid, Stamford, Conn.

[21] Appl. No.: 624,954

[22] Filed: Dec. 10, 1990

Related U.S. Application Data

[63] Continuation of Ser. No. 191,941, Jun. 28, 1988, abandoned.

[51] Int. Cl.$^5$ .................................................. C08F 2/02
[52] U.S. Cl. .................................. 526/88; 526/72; 526/292.3
[58] Field of Search ............... 526/88, 219.1, 219.5, 526/292.2, 292.3, 292.95, 303.1

[56] References Cited

U.S. PATENT DOCUMENTS 4,585,843 4/1986 Flesher .................................. 526/63

Primary Examiner—Joseph L. Schofer
Assistant Examiner—Jeffrey T. Smith
Attorney, Agent, or Firm—Frank M. Van Riet

[57] ABSTRACT

A high solids polymerization process for producing a water-soluble polymer wherein a mixture of exothermically polymerizable material in water is cooled to produce a cold syrup or crystalline slurry of the polymerizable material in a polymerizable material/water solution and said syrup or slurry is initiated to polymerization wherein the reaction is controlled by absorbing the exothermic heat of polymerization employing the sensible heat and/or the latent heat of fusion of the cooled syrup or slurry as a heat sink. This polymerization process is capable of being carried out in a batch as well as a continuous process.

18 Claims, 3 Drawing Sheets

HIGH SOLIDS PROCESS FOR THE PRODUCTION OF WATER SOLUBLE POLYMERS BY EXOTHERMIC POLYMERIZATION

This is a continuation of co-pending application Ser. No. 07/191,941 filed on June 28, 1988, now abandoned.

FIELD OF THE INVENTION

The present invention relates to the process of high solids polymerization, more particularly, the process of polymerization of water-soluble polymers at high solids and particularly the use of low temperature reaction mixtures initiation in the process of high solids polymerizible.

BACKGROUND OF THE INVENTION

The production of polymers at higher solids levels is desirable to provide a more efficient polymerization process, thereby increasing throughput. Until now, polymerization of water-soluble synthetic polymers such as polyacrylamide and copolymers thereof at high solids levels has been limited because of the great exothermic heat generated during polymerization. Generally, for example, the monomer content of a solution polymerization is limited to about 30% for acrylamide, for example, because of the temperature rise.

To overcome this problem, several methods have been considered. Among those proposed are a pressure process, where the reaction proceeds adiabatically and steam generation is suppressed by applying external pressure, and an evaporative process, where heat generated by the reaction is disipated by evaporation of water from the gel. The pressure process requires exponentially increasing external pressure to suppress boiling as the solids level rises, where the evaporative process requires large surface area for the reactants (e.g. thin film or sprayed droplets).

Alternative approaches to this problem are taken in Sumitomo, Jap. Ref. 57/63,305 and Flesher, U.S. Pat. No. 4,585,843. The Sumitomo approach involves the extraction of heat from the system during polymerization through the use of multiple heat exchange surfaces within the reactor. These cooling plates are placed in the reactor to form cavities, or subdivided sections, having thicknesses of 2-100 mm. This method is not attractive due to the very poor heat transfer from gels and the tendancy for the gel to stick to the heat transfer surface. Further, the teaching of Sumitomo is not applicable to a continuous process.

The Flesher approach to high solids polymers employs a chemical heat extraction process having a salt hydrate (e.g. sodium sulfate) that undergoes an endothermic change to extract heat from the system during polymerization. The endothermic compound must be non-reactive with the monomer or monomers and resultant polymers, and in sufficient amount to counterbalance the major part of the exothermic heat of reaction. The disadvantage of this method is that the final product retains a large amount, i.e. 30-50%, of the salt.

The continuous production of high molecular weight water-soluble synthetic polymers in Landolt et al., U.S. Pat. No. 4,138,539, represents the present state of the art. This provides an improved process for preparing a water-soluble synthetic polymer in a readily dissolved powder form. The Landolt patent discloses polymerization of a monomer solution at approximately 10° C. with the polymerized gel emerging at approximately 95° C. by adjusting the residence time for polymerization to provide a proper combination of temperature and time to achieve the desired conversion and molecular weight. Usually a residence time of 30 to 120 minutes is considered best by Landolt. Landolt utilizes a 30 weight percent monomer solution and obtains a polymer gel generally containing 31 to 40 weight percent polymer concentration. The Landolt process is deficient however because it cannot be used to polymerize monomer solutions having higher values of monomer weight percent resulting in higher polymer concentration in the polymer gel. The heat of polymerization cannot be removed rapidly enough so lower solids solutions have to be used. In view of the limited success of high solids levels in current polymerization processes, it is, therefore, an object of the present invention to provide a process for efficient, high solids polymerization.

It is a further object of the invention to provide an efficient high solids polymerization procèss which can be run as a continuous as well as a batch process.

It has been discovered that higher solids levels during the exothermic polymerization of water soluble polymers can be achieved through the use of a cooled monomer solution of a syrup or a partially frozen slurry which is then initiated. In this process, a cooled syrup or slurry of monomer crystals is initiated and polymerized to produce a high solids gel. The resulting exotherm of polymerization is depressed by the sensible heat of the solution and/or the latent heat of fusion of the frozen part of the monomer slurry thus allowing higher solids monomer solution to be polymerized.

SUMMARY OF THE INVENTION

According to the present invention, there is provided a high solids polymerization process for producing a water soluble polymer by exothermic polymerization, said process comprising: (a) preparing a reaction mixture comprising 100 parts of exothermically polymerizable material admixed with 33 to 250 parts of water; (b) cooling said reaction mixture to a temperature of below about 0° C. to produce a cold high solids content mixture comprising (i) dissolved monomer and water or (ii) dissolved monomer, crystals of monomer, and water; (c) polymerizing the dissolved monomer in said mixture, and (d) controlling the polymerization reaction by absorbing the heat of polymerization into a heat sink comprising sensible heat, and, where present, the latent heat of fusion of said crystals of monomer.

The sensible heat and/or heat of fusion of the cooled syrup or slurry is used to depress the exothermic $T_{max}$. This permits better control of the exothermic polymerization reaction.

With suitable monomers, e.g., acrylamide, partially frozen monomer slurry comprises a two phase mixture of liquid and solid monomer leads to the production of a soluble polymer. This result is unexpected as it is known that the initiation of a solid monomer leads to an insoluble polymer.

Further, in one aspect of this invention initiation of a cooled syrup or slurry to produce high solids polymers can be used in a continuous, in-line process. The continuous process envisions using a scraped surface heat exchanger which cools the solution to a syrup or a slurry frozen phase of the monomer at the wall of a tube and a scraper which removes the cooled monomer from the wall, thereby creating a cooled solution within the tube. The monomer solution moves into the tube through a product inlet opening and the cooled syrup or slurry is moved out of the tube through the product outlet opening to complete the continuous process. Polymerization occurs outside the scraped surface heat exchanger, preferably in an advancing polymerization zone of the type shown in U.S. Pat. No. 4,138,539.

The benefit of higher solids level polymer production is seen in energy efficiency, reducing both the cooling load and the drying load necessary in the production of a finished product. Product quality is also markedly improved because of more effective heat control.

DETAILED DESCRIPTION OF THE PRESENT INVENTION

In one convenient manner of carrying out the process, a degassed solution of water soluble monomer at high solids concentration is introduced into a scraped surface heat exchanger and cooled to produce a partially frozen, i.e. two-phase, slurry of monomer crystals or a cooled monomer solution syrup. During the polymerization, the exothermic heat of polymerization is offset by the sensible heat of the feed as well as latent heat of fusion when the mixture contains crystallized monomer(s). This absorption of exothermic heat during polymerization permits higher solids levels to be polymerized.

The polymerizable material may be any polymerization monomer or prepolymer or mixture thereof which is capable of polymerization by an exothermic reaction. The polymerizable material generally comprises a polymerizable monomer, and preferably comprises one or more mono-ethylenically unsaturated monomers, especially acrylic monomers, or prepolymers formed from them. The polymer may be anionic, cationic or nonionic. Suitable acrylic monomers include (meth) acrylic acid and its salts, (meth) acrylic esters and imides, diallyldialkyl ammonium chlorides, 2-acryl-amido-2-methyl propane sulfonic acid and its salts, N-vinyl-N-methyl acetamide and allyl sulfonic acid and its salts. Preferred monomers are acrylamide, sodium acrylate, dialkylaminoalkyl (meth) acrylates, and dialkylaminoalkyl (meth) acrylamides, including quaternized derivatives of the dialkylamino compounds, for instance quaternized dimethylaminoethyl acrylate. The monomer may also be a Mannich base of acrylamide. Blends of two or more of the monomers are often preferred, so as to form copolymers, terpolymers, and the like. Other monomers that may be used include vinyl pyrrolidone and vinyl sulfonic acid and the monomers necessary to form styrene maleic anhydride copolymers or dimethylamine-epichlorohydrin polymers, and the like.

The preferred monomer comprises acrylamides alone, or in further combinations with one or more comonomers, such as acrylamide and dimethylaminoethyl methacrylate methyl chloride quaternary salt, acrylamide and sodium acrylate, and the like.

The temperature rise due to the exothermic reaction involved in the solution polymerization process limits the monomer content of the solution prepared for polymerization. In the prior art, the monomer content of a solution polymerization is limited to about 30% for acrylamide because of the temperature rise. The monomer or comonomer content of a cooled solution polymerization, on the other hand, using the process of the present invention, should be as high as possible, for example, from 35-70% by weight, and is more preferably 45-70% by weight.

A cooled syrup or slurry of monomer or comonomer crystals can be produced in various ways known to skilled in the art, all such methods are intended to fall within the scope of the invention.

Figure 1:
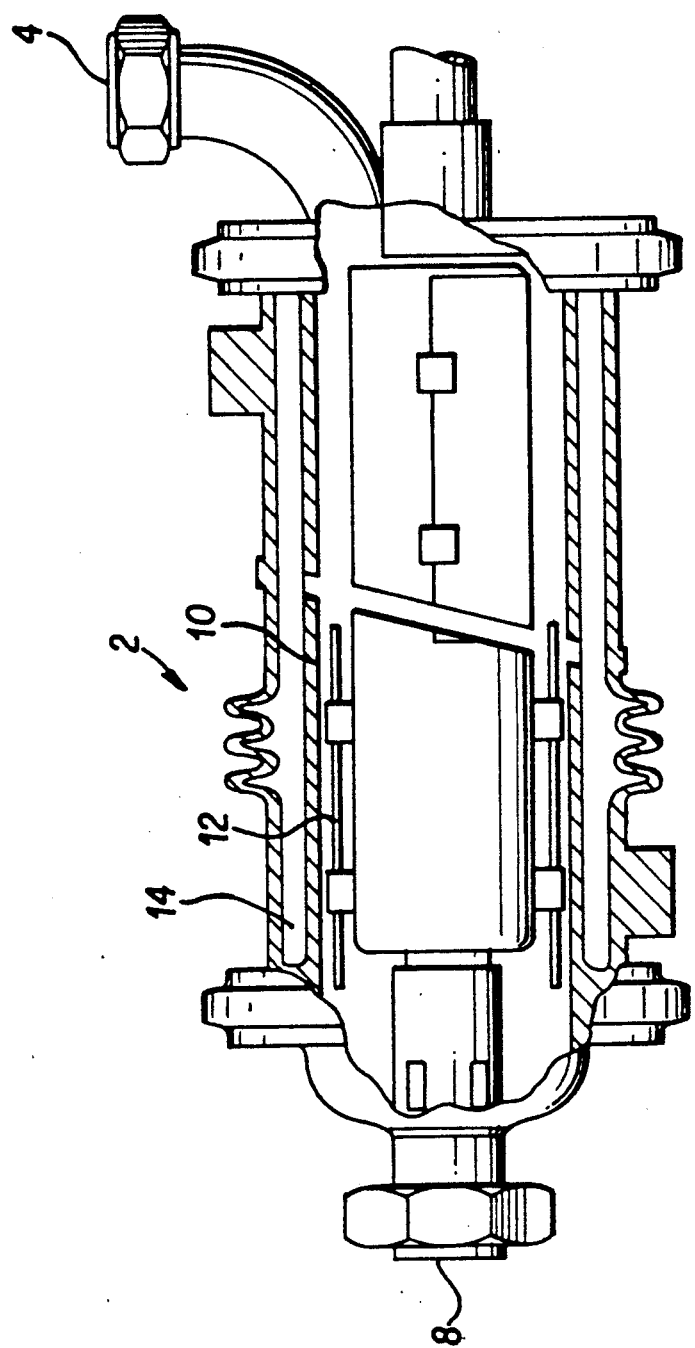
FIG. 1 is a cross sectional view of surface scraped heat exchanger which may be employed in the present invention.

The preferred method of producing a crystal slurry or syrup of the monomer or comonomer solution is continuous and employs a scraped surface heat exchanger 2, as shown in FIG. 1, fed with the reaction mixture. Such a heat exchanger comprises a cylindrical tube with internal rotating blades 12 which "scrape" the tube wall 10. The cooling medium is supplied to an annular jacket 14 on the outside of the tube wall 10. The monomer or comonomer solution enters through the product inlet 4 and is rotated by a shaft 6 running the length of the cylindrical tube along the cooled cylinder wall 10. As the solution moves through the cylinder, cooling occurs at the cylinder wall 10. The blades 12, affixed to rotating shaft 6, move the cooled or crystallized monomer or comonomer solution from the cylinder wall 10, mix it with the moving solution in a liquid phase to form a two phase slurry or a single phase cooled syrup and then transports the syrup or slurry out of the cylinder tube through the product outlet 8. Polymerization then occurs outside the scraped surface heat exchanger, preferably in an advancing polymerization zone, and more preferably in a continuous belt reactor.

A convenient process to polymerize the chilled reaction mixture and to isolate the polymer in useful form comprises adding from about 100 to 2,000 parts per million based on the total weight of said reaction mixture of a free radical initiator; (b-1) separatley preparing an aqueous redox initiator system; (b-2) mixing said redox system with said cold high solids reaction mixture while introducing said mixture into an advancing polymerization zone; (c-d) maintaining said monomer solution in said polymerization zone at suitable temperature to provide an aqeous polymer gel; (e) removing said polymer gel from said polymerization zone; and (f) granulating said polymer gel. This process, by effecting polymerization in an advancing polymerization zone, which supplies the polymer gel directly to the subsequent granulating and drying steps, eliminates the need for various equipment and handling steps associated with separate polymerization and drying procedures. It also eliminates the need for added precipitant and the deficiencies associated therewith. The process also eliminates or minimizes hydrolysis of the polymer processed. The process provides the polymer in the desired form with minimal unconverted monomer and insoluble particles.

As the free radical initiator to be incorporated in the monomer solution, use can be made of azobisisobutyronitrile, 4,t-butylazo-4'cyanovaleric acid, 4,4'-azobis(4-cyanovaleric acid, 2,2'-azobis-(2-amidinopropane) hydrochloride, which is preferred, and the like. The free radical initiator should be used in effective amount which will vary depending upon the choice of monomers employed, the polymerization temperature and residence time, and other variables which preclude setting limits as to the precise quantity of free radical initiator to be used in any given case. However, it has been found that, generally, an amount corresponding to about 100 to 2,000 parts per million free radical initiator based on the total weight of monomer solutuion to be polymerized is effective.

The redox system used as polymerization catalyst is generally one that is conventionally used. It may be based on a persulfate, for example, a system comprising potassium persulfate and sodium sulfite or on hydrogen peroxide and sodium sulfite. Preferably, ammonium persulfate and ammonium ferrous sulfate are employed. The components of the redox system are separately prepared for addition to the cold reaction mixture when the mixture is to be polymerized. The amount of redox system to be employed will also vary widely depending on various factors as indicated with respect to the free radical initiator and cannot be stated in precise quantities to cover every case. However, it has been found that in the case of the preferred system, the use of the persulfate will generally be in the range of about 20-120 parts per million and the use of ferric ammonium sulfate will generally be in the range of 1-25 parts per million based on the weight of monomer.

Polymerization is conveniently done in an advancing polymerization zone through which the cold reaction mixture is transported while providing the necessary temperature and residence time to provide a polymer of the required molecular weight. The entering reaction emerges from the polymerization as a rigid gel of which the polymer generally has a molecular weight in excess of about one million, and, preferably, in excess of about ten million for preferred monomers. The mixture must enter the polymerization at a relatively low temperature about $-30°$ C. to $-10°$ C. and emerges at a relatively high temperature, e.g. about 95° C., with the residence time being adjusted to provide the proper combination of temperature and time to achieve the desired conversion and molecular weight. The actual temperature and time of polymerization will vary widely depending upon numerous factors such as choice of monomer or monomers, solution concentrations, initiator and redox system usage, feed rate of monomer solution, and other factors so that a limited specification of temperature and time cannot be given. Generally, the temperature range will vary from about $-30°$ to 100° C. over the entire polymerization zone. Preferably, the temperature peak will be in the range of about 95° to 98° C. Usually, a residence time of about 30 to 200 minutes is effective. When the preferred high temperature peak range is reached, an additional residence time of about 40 to 75 minutes is generally effective to provide the desired molecular weight values. The monomer solution is deoxidized prior to entry in the polymerization in accordance with conventional procedures, e.g., by blowing nitrogen through it. As a result of exposure to the polymerization reaction as described, the reaction mixture will generally lose a portion of its water content. The amount of water loss is generally small in the case where a 30 weight percent monomer solution is initially employed, the resulting polymer gel will usually contain from about 31 to 40 weight percent polymer concentration. Such a loss of water has not adverse effects on processing or the polymer product.

The polymer gel obtained as described is the form of a continuous slab which enters the granulator. The slabs are granulated to provide particles having an average diameter in the range of about ⅛ to ½ inch for partial drying. The slabs are readily granulated using appropriate equipment. The particle size is not especially critical and particles of the size range indicated are readily provided.

The granulated polymer gel is then dried by conventional procedures.

After the further drying step, the resulting polymer comminuted is communicated to provide a free-flowing powder which readily dissolves in water. The polymer product may be hygroscopic and accordingly, it is desirable to package the freshly ground polymer composition in moisture-proof containers to prevent cakeing during storage prior to use.

DESCRIPTION OF THE PREFERRED EMBODIMENTS

The following are examples of the present invention but are not intended nor are they to be construed so as to limit the invention in any manner whatsoever.

It is understood that many monomers and comonomers can be more efficiently polymerized by a cooling process as herein disclosed.

It is further understood that this sensible heat and/or latent heat extraction process can be used alone or in combination with a pressure process, an evaporative process, a chemical heat extraction process or any combination of the above.

In the Examples, the following abbreviations have the following meanings:

V50—2,2'-azobis(2-amidino propane) hydrochloride, a free radical initiator produced by Wako Chemicals U.S.A., Inc.

APS—ammonium persulfate, a redox catalyst component

FAS—ferrous ammonium sulfate, a redox catalyst component

Q9—dimethylaminoethyl acrylate methyl chloride quaternary salt.

EXAMPLE 1

A batch process is carried out by initiating a slurry of cold acrylamide crystals.

Water, 122 parts by weight, V-50, 1000 parts per million by weight and APS, 100 parts per million by weight are degassed with flowing nitrogen.

Figure 3:
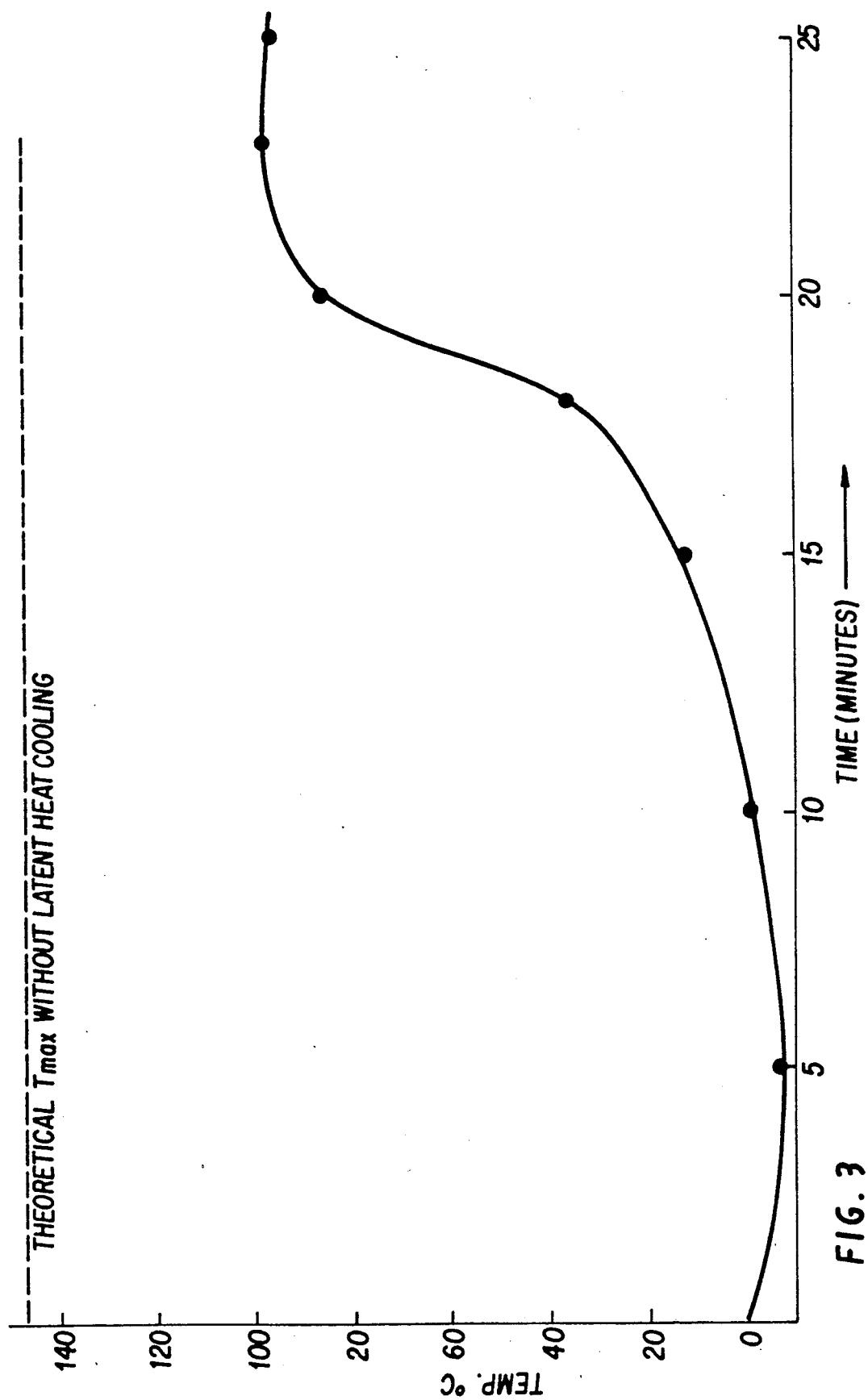
FIG. 3 is a graphical plot of the exotherm $T_{max}$ latent heat cooling as a function of time.

The temperature of this degassed solution is reduced to 0° C. and 100 parts of acrylamide crystals and 7 parts per million of FAS are added, the degassing is continued until polymerization has started. As polymerization proceeds the product is stirred as long as possible to keep the acrylamide crystals in suspension. The exotherm which initially drops on adding the acrylamide exhibits a smooth profile and reaches a $T_{max}$ of 102° C. compared with a theoretical $T_{max}$ of 148° C. for a 46% w/w solution of acrylamide (without crystals, see FIG. 3).

Results:

| PRODUCT TYPE | SOLIDS CONTENT | STANDARD VISCOSITY | INSOLUBLES | FREE MONOMER | VISCOSITY RATIO |
|---|---|---|---|---|---|
| Polyacryli- | 45.8% | 4.01 cp | 1.5 | 0.097% | 2.3 |

| | | | Results: | | |
|---|---|---|---|---|---|
| PRODUCT TYPE | SOLIDS CONTENT | STANDARD VISCOSITY | INSOLUBLES | FREE MONOMER | VISCOSITY RATIO |
| mide gel | | | | | |

EXAMPLE 2

A solution containing the ingredients given in the table below is prepared.

| Ingredients | gms |
|---|---|
| Acrylamide Solution (52.6%) | 337.0 |
| Deionized Water | 161.0 |
| Ammonium Chloride | 2.0 |
| Total Weight | 500.0 |
| Monomer Solids 35.4% | |

The solution is adjusted with caustic soda to pH of 6 and sparged with nitrogen for 30 minutes. The solution is then cooled (with stirring) to −7° C. at which stage the solution contains crystals in suspension. This solution is then initiated using a redox system of ammonium persulfate and ferrous ammonium sulfate. The reaction reaches a maximum temperature of 96° C. in 2 hours. After cooling, the gel is chopped and dried to form a powder with a dry weight of 94%. On analysis, the product, polyacrylamide, gives the following results:

| STANDARD VISCOSITY | INSOLUBLES |
|---|---|
| 4.3 cps | 0.2% |

EXAMPLE 3

A solution containing the ingredients in the table below is prepared.

| Ingredients | gms |
|---|---|
| Acrylamide Solution (52.6%) | 210 |
| Q9 Monomer (77%) | 215 |
| Adipic Acid | 13 |
| Deionized Water | 112 |
| Total Weight | 550 |
| Monomer Solids 50.2% | |

The solution is adjusted with sulfuric acid to a pH of 3 and sparged with nitrogen for 30 minutes. The solution is then cooled (with stirring) to −30° C. At this temperature the solution contains some crystals. The solution is initiated using a redox system of ammonium persulfate and ferrous ammonium sulfate. The reaction reaches a maximum temperature of 92° C. in 95 minutes. The final dry polymer is prepared in the same way as Example 2. The product analysis is:

| STANDARD VISCOSITY | INSOLUBLES | DRY WEIGHT |
|---|---|---|
| 3.3 cps | 2.0% | 91.6% |

EXAMPLE 4

Figure 2:
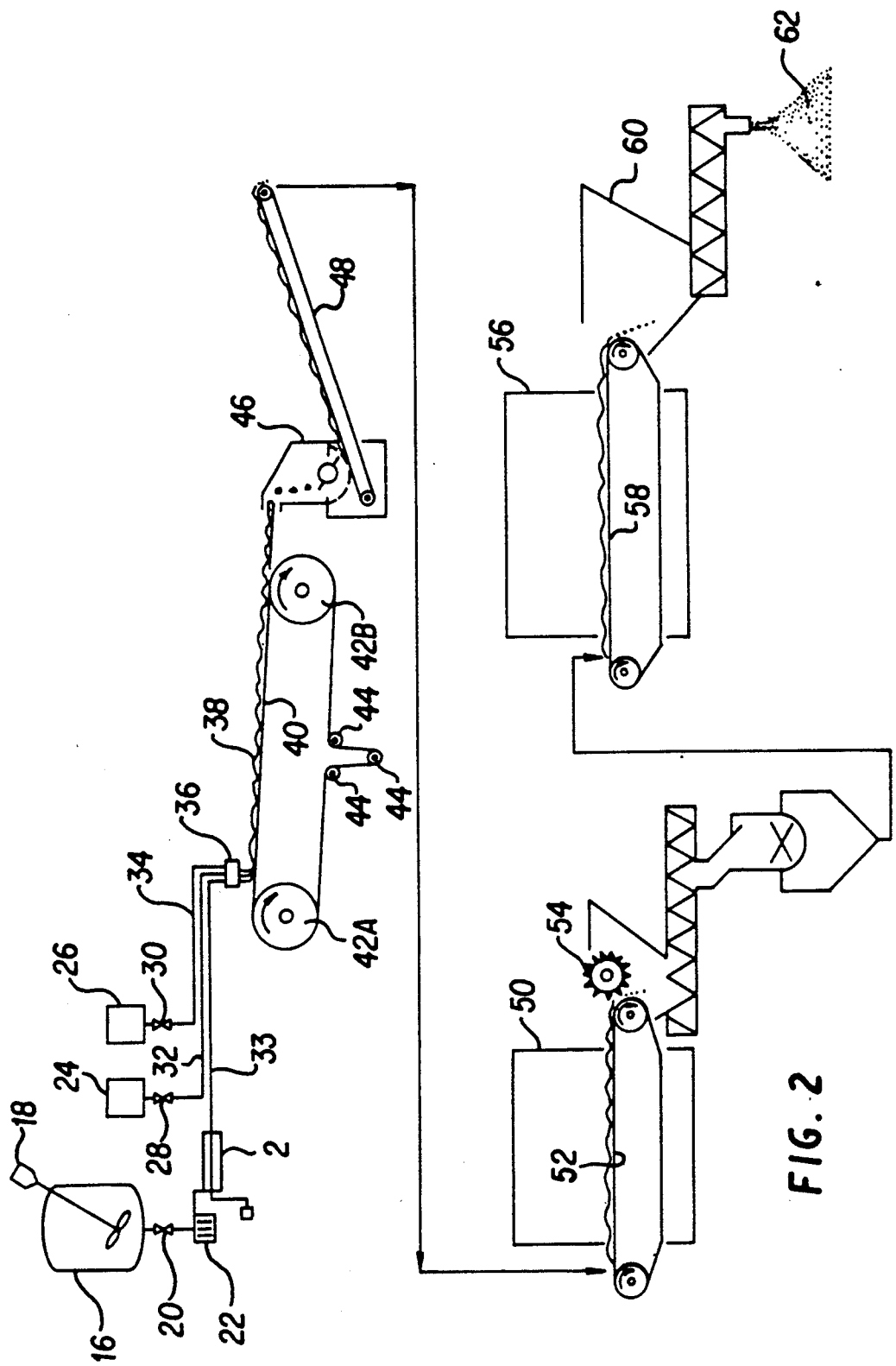
FIG. 2 represents a schematic drawing illustrating the important features of the process according to the preferred embodiments, with a surface scraped heat exchanger strategically located.

Using the basic equipment depicted in FIG. 2, a powdered polymer composition is prepared.

The reaction mixture is prepared at 35.4% total monomer content and consists of acrylamide. To 161 parts of water in a reactor 18, eqiupped with a stirrer, 337 kilograms of acrylamide, 52.6% in water, is added and dissolved. Finally, there are added 2.475 parts of V50 with 2.297 parts of methanol as dissolution aid therefor. The pH of the monomer solution is 7.5.

The redox system employed consists of separate aqeuous solutions of ferrous ammonium sulfate and ammonium sulfate prepared in tanks 24 and 26 of the Figure. Tank 24 contains 0.26525 gram per liter of ferrous ammonium sulfate and tank 26 contains 0.75840 gram per liter of ammonium persulfate.

The usage of V50 is 721 parts per million based on the total weight of monomer. Sufficient solution of ferrous ammonium sulfate is provided to supply 6.33 parts per million based on the total weight of monomer and sufficient solution of ammonium persulfate is provided to supply 31.1 parts per million based on the total weight of monomer.

The monomer feed is metered through valve 20 to a plate and frame chiller 22 and then to a scraped surface heat exchanger 2 to chill the mixture to −7° C., then to a mixing nozzle 36 to provide a feed rate of 2.0 kilograms per minute. The redox system is simultaneously metered through valves 28 and 30 to provide the necessary parts per million of ferrous ammonium sulfate and ammonium persulfate indicated.

The supply lines of monomer solution and redox system to the mixing nozzle are designated by 33, 32 and 34 respectively. The resulting mixed solution is shown as 38 is carried on the advancing belt 40 rotated by pulleys 42A and 42B and containing gravity take-up 44. The first pulley 42A is at a higher elevation than the second pulley 42B so that the monomer solution tends to advance toward the exit end of the polymerization zone by gravity while it remains liquid. The belt is concave across its lateral dimensions so that the monomer solution is retained within the concavity. In start-up, a dam of previously prepared gel is not necessary on the belt to prevent undue migration of the monomer solution forwardly along the belt. The belt revolves within a confined zone, not shown, with adequate provision for reaching and holding a desired polymerization temperature. Before start-up of the reaction, the monomer solution and redox system is degassified and the polymerization zone is purged with nitrogen.

The mixture of monomer solution with redox system is entered into the polymerization at a temperature of −7° C. The belt speed is such that it requires 88 seconds to travel a distance of 1 foot in linear direction, which provides a residence time of 65 minutes within the polymerization zone. At about midpoint in the polymerization zone, the formed polymer gel is at a temperature of 96° C. and this temperature is maintained the remaining distance of the advancing polymerization. In the initial portion of the polymerization, the monomer solution quickly forms a gel, the temperature rising slowly over a distance is about the first one-fourth of the polymerization zone to about 40° C., then rapidly in the second one-fourth of the zone to about 96° C. The emerging gel has a polymer content of 35.4%.

The polymer gel emerging from the polymerization is conveyed to a granulator 46 which converts the slab-like polymer gel to granules having an average particle size of abour 5/16 inch diameter. The granules are then conveyed by conveyer 48 to the partial drying oven 50 through which the granules are conveyed by means of belt 52. The dryer is maintained at a temperature of 85° C. and is equipped with a blower, not shown, which forces hot air through the gel granules. After drying for one hour in such fashion, the polymer content of the resulting partially dried gel has increased to 60%.

The partially dried polymer gel which emerges from dryer 50 is caked and the cake is broken in cake-breaker 54 and converted to dryer 56 through which they are conveyed by belt 58. The temperature of dryer 56 is also maintained at 85° C. and hot air is blown through the polymer granules by a blower not shown. After a residence time of 1.5 hours in dryer 56 the polymer granules have their moisture content reduced to 8.4%. The polymer granules emerging from dryer 56 are deposited in comminuter 60 for pulverization and emerged as a fine powder at exit port 62. The molecular weight of the dried polymer is substantially the same as that of the intital polymer gel obtained, indicating no polymer degradation occurrs as a result of drying.

The foregoing patents and publications are incorporated herein by reference.

Many variations of the present invention will suggest themselves to those skilled in the art in light of the foregoing description. For example, the monomer composition can comprise 10% dimethylaminoethyl methacrylate and 90% acrylamide; 40% 2-vinylimidazoline and 60% acrylamide, 25% 2-vinylpyridine and 75% acrylamide, 40% dimethylaminoethyl acrylate quaternized with dimethyl sulfate and 60% acrylamide, 50% diallyldimethylammonium chloride and 50% acrylamide, and the like. All such obvious variations are within the full intended scope of the appended claims.

I claim:

1. A high solids polymerization process for producing a water soluble polymer by exothermic polymerization, said process comprising:
   (a) preparing a reaction mixture comprising 100 parts of exothermically polymerizable material admixed with 33 to 250 parts of water;
   (b) cooling said reaction mixture to a temperature of below about 0° C. to produce a cold high solids content mixture consisting essentially of dissolved monomer, crystals of monomer, and water;
   (c) polymerizing the dissolved monomer in said mixture, and
   (d) controlling the polymerization reaction by absorbing the heat of polymerization into a heat sink comprising sensible heat, and, where present, the latent heat of fusion of said crystals of monomer.
2. A process as defined in claim 1 wherein the cooled reaction mixture comprises a suspension of crystals of monomer in a water solution of monomer and the heat sink comprises sensible heat and the latent heat of fusion of said crystals.
3. A process as defined in claim 1 wherein step (b) is carried out continuously in a scraped surface heat exchanger.
4. A process as defined in claim 1 wherein steps (c) and (d) are carried out continuously and in an advancing polymerization zone.
5. A process as defined in claim 4 wherein steps (c) and (d) are carried out in a continuous belt reactor.
6. A process as defined in claim 1 wherein step (b) is carried out in a scraped surface heat exchanger and steps (c) and (d) are carried out in a continuous belt reactor.
7. A process as defined in claim 1 including the steps of
   (b-1) separately preparing an aqueous redox initiator system; and
   (b-2) mixing said redox system with the cold high solids content mixture of step (b) prior to polymerization step (c).
8. A process as defined in claim 7 wherein step (b-2) is carried out while introducing the cold reaction mixture continuously into an advancing polymerization zone.
9. A process as defined in claim 1 including recovering the polymer by
   (e) removing the polymer from the polymerization zone in the form of an aqueous polymer gel; and
   (f) granulating and drying said polymer gel.
10. A process as defined in claim 1 wherein the content of polymerizable material in the reaction mixture in step (a) is from about 30 to about 70% by weight.
11. A process as defined in claim 1 wherein the polymerizable material comprises a monomer, alone, or in admixture with at least one comonomer and the content of said polymerizable material in the reaction mixture is from about 35 to about 70% by weight.
12. A process as defined in claim 1 wherein the reaction mixture in step (a) includes from about 100 to about 2,000 parts per million, based on the total weight of the mixture, of a free radical initiator.
13. A process as defined in claim 12 wherein the free radical initiator comprises 2,2'-azobis-(2-amidinopropane) hydrochloride.
14. A process as defined in claim 1 wherein the reaction mixture comprises water and acrylamide.
15. A process as defined in claim 1 wherein the reaction mixture comprises water, acrylamide and dimethylaminoethyl methacrylate chloride quaternary salt.
16. A process as defined in claim 1 wherein the reaction mixture comprises, water, acrylamide and sodium acrylate.
17. A process as defined in claim 1 wherein the polymerization reaction is controlled by step (d) in the range of from about $-30°$ to about 100° C.
18. A process as defined in claim 17 wherein the polymerization reaction is controlled in step (d) to a maximum temperature in the range of from about 93° to about 98° C.

* * * * *